(12) United States Patent
Bowers et al.

(10) Patent No.: US 7,792,139 B2
(45) Date of Patent: Sep. 7, 2010

(54) SYNCHRONOUS AND DISTRIBUTED DATA ACQUISITION AND TRANSMISSION SYSTEM

(75) Inventors: John J. Bowers, Bonita Springs, FL (US); Xun Chen, Akron, OH (US)

(73) Assignee: DATAQ Instruments, Inc., Akron, OH (US)

( * ) Notice: Subject to any disclaimer, the term of this patent is extended or adjusted under 35 U.S.C. 154(b) by 915 days.

(21) Appl. No.: 11/473,902

(22) Filed: Jun. 26, 2006

(65) Prior Publication Data
US 2007/0297443 A1    Dec. 27, 2007

(51) Int. Cl.
H04L 12/66 (2006.01)
(52) U.S. Cl. .................. 370/463; 370/244; 370/249
(58) Field of Classification Search ......... 370/200–253, 370/272–390, 431–546
See application file for complete search history.

(56) References Cited

U.S. PATENT DOCUMENTS

| | | | |
|---|---|---|---|
| 6,606,582 B1 * | 8/2003 | Brinkman et al. | 702/188 |
| 7,433,302 B2 * | 10/2008 | Allen | 370/224 |
| 7,433,365 B1 * | 10/2008 | Burch et al. | 370/437 |
| 2003/0223409 A1 * | 12/2003 | Wiebe | 370/352 |
| 2004/0234000 A1 * | 11/2004 | Page | 375/259 |
| 2006/0229067 A1 * | 10/2006 | Heisier et al. | 455/423 |

* cited by examiner

*Primary Examiner*—Ricky Ngo
*Assistant Examiner*—Iqbal Zaidi
(74) *Attorney, Agent, or Firm*—Renner, Kenner, Greive, Bobak, Taylor & Weber

(57) ABSTRACT

A daisy chained ethernet network data acquisition system for use in industrial processes is shown. The system employs standard category five twisted-pair connectors, each having four twisted-pairs associated therewith. Two of the twisted-pairs are employed for transmitting and receiving command signals and data, while the remaining two are employed for transmitting a common clock and synchronizing signal to each of the various stages of the processing line at which data is to be acquired. The system thus allows for the time correlated acquisition of data from a plurality of stages or stations of a lengthy processing line by employing ethernet interconnection.

11 Claims, 2 Drawing Sheets

SYNCHRONOUS AND DISTRIBUTED DATA ACQUISITION AND TRANSMISSION SYSTEM

TECHNICAL FIELD

The invention herein resides in the art of data acquisition and transmission systems and, more particularly, to such a system using the ethernet in an industrial process facility. More specifically, the invention relates to a data acquisition and transmission system that gathers data from multiple sources in a distributed application, and in which the data acquisition from such multiple sources is synchronized in time by the implementation of a common clock and a synchronization signal. Furthermore, the distance between sources may be up to 100 meters or more.

BACKGROUND ART

Many industrial processing facilities are multi-staged. In such facilities, the processing stages are often spaced apart by hundreds of feet. While ethernet communication arrangements have been employed in the past, the acquisition of data from each stage has not, however, been synchronous with all other stages. In the past, the time correlation of data acquired at the various stages has necessarily been devised and developed at a later time, during the assessing of the data itself, if it is possible at all.

The prior art has not been capable of obtaining a continuous and synchronized recording of the operating parameters of the various stages in a distributed process. Indeed, there has been no capability of acquiring the data from the various stages on a time correlated basis. Any attempt to correlate data from one stage with the data taken from another stage at the same point in time has been fraught with complexity and technical difficulty in the best case, and impossible in the worst.

The prior art has taught the acquisition of data from various stages over the ethernet, with the data being transferred by means of standard category 5 connectors and conductors. Typically, such have comprised 4 sets of twisted-pair wire, but only 2 pairs have been used for data acquisition and control. In such systems, each processing stage has provided data separate and apart from the other stages.

There remains a need in the art for a synchronous data acquisition and transmission system in which the data is acquired from the various stages of an industrial process under the control of a common clock and synchronizing signal.

DISCLOSURE OF INVENTION

In light of the foregoing, it is a first aspect of the invention to provide a synchronized data acquisition system for use in a staged distributed process.

Another aspect of the invention is the provision of a synchronized data acquisition system for use in industrial processes employing an ethernet network.

Yet a further aspect of the invention is the provision of a synchronized data acquisition system in which the various stages of the data acquisition system are daisy chained together.

A further aspect of the invention is the provision of a synchronized data acquisition system in which the distance between stages may be as great as 100 meters or more.

Yet a further aspect of the invention is the provision of a synchronized data acquisition system in which each stage has its own multi-port switch.

Still a further aspect of the invention is the provision of a synchronized data acquisition system in which each stage contains clock recovery and reconstruction and retransmission circuitry.

Still a further aspect of the invention is the provision of a synchronized data acquisition system in which the clocks for synchronization between stages are transmitted on otherwise unused twisted-pair of standard category 5 ethernet cable.

Yet an additional aspect of the invention is the provision of a synchronized data acquisition system in which the clocks controlling data acquisition at various stages are received and restored with differential receivers and phase lock loop circuitry.

The foregoing and other aspects of the invention that will become apparent as the detailed description proceeds are achieved by a synchronized data acquisition system in a distributed system having a plurality of stages, each separated by as much as 100 meters or more, comprising: a plurality of monitoring instruments, one at each of said stages, for monitoring selected operating parameters at said stages; a plurality of ethernet interface gates, one associated and communicating with each of said monitoring instruments, said ethernet interface gates being daisy-chained together, each to an immediately adjacent one as much as 100 meters distant; a data and control buss interconnecting each of said ethernet interface gates with an associated one of said monitoring instruments; and a processing unit connected to one of said ethernet interface gates.

Other aspects of the invention that will become apparent herein are achieved by a synchronized data acquisition system in a processing line have a plurality of processing stations, each separated by as much as 100 meters or more, interconnected by an ethernet, comprising: a plurality of monitoring instruments, one at each processing station, monitoring selected operating parameters at said station; a plurality of ethernet interface gates, one associated and communicating with each of said monitoring instruments, each interface gate having an ethernet input and output, said input and output of at least certain of said ethernet interface gates being connected to said output and input of said interface gate of adjacent stations respectively; a data control buss interconnecting each of said ethernet interface gates with an associated one of said monitoring instruments; and a digital processing unit connected to an input of one of said ethernet interface gates.

DESCRIPTION OF DRAWINGS

For a complete understanding of the aspects, structure and technique of the invention, reference should be made to the following detailed description and accompanying drawings wherein.

BEST MODE FOR CARRYING OUT THE INVENTION

Figure 1:
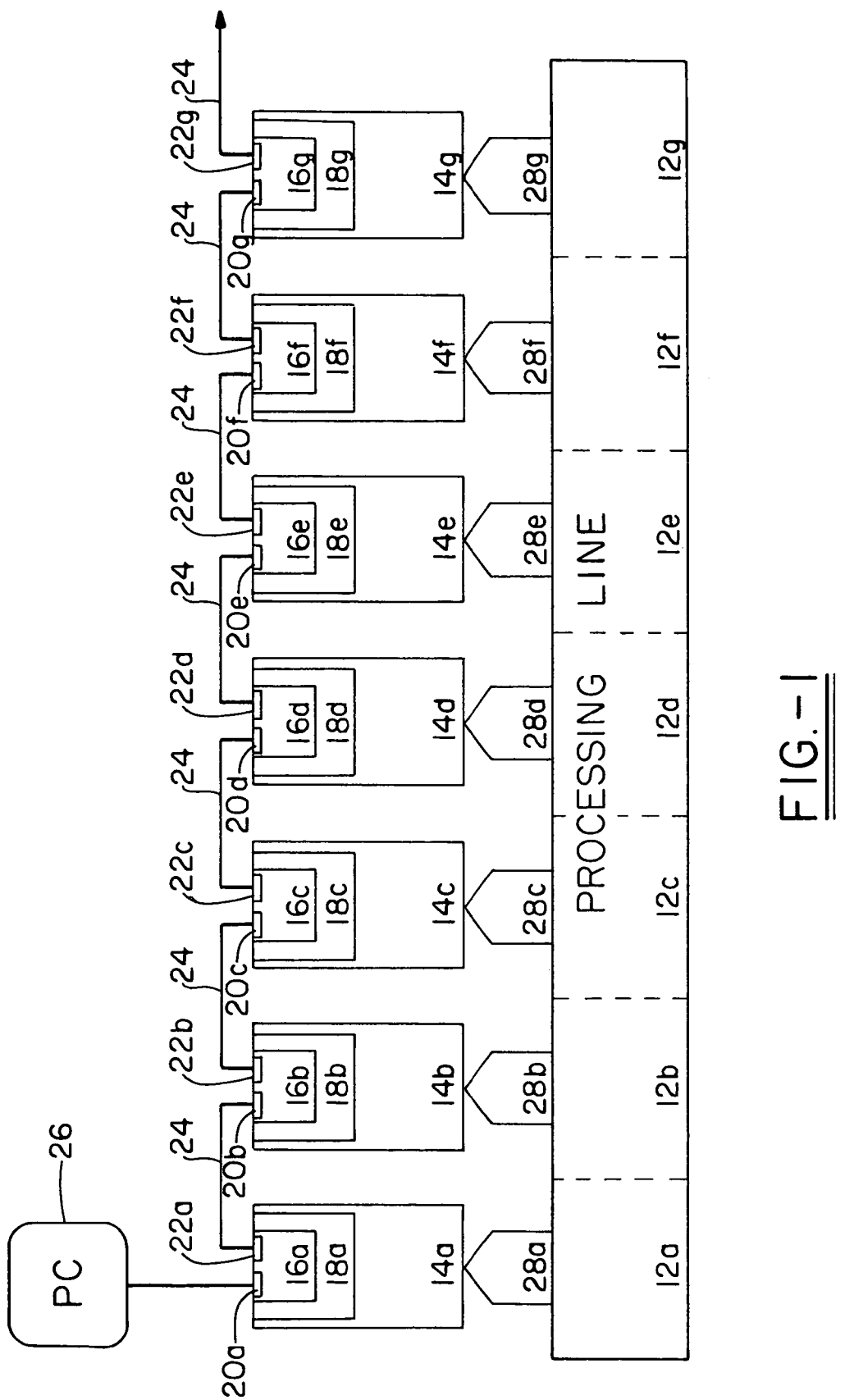
FIG. 1 is schematic block diagram of a synchronous data acquisition and transmission system made in accordance with the invention.

Referring now to the drawings and more particularly FIG. 1, it can seen that a synchronized data acquisition and transmission system made in accordance with the invention is designated generally by the numeral 10. The system 10 is employed with a staged and distributed process 12, of a type typically employed in industry, such as a steel mill, aluminum mill, paper mill, web printing process, or the like. With present technology, the staged and distributed process 12 may be any length, with the distance between adjacent stages being up 100 meters using an ethernet data processing interconnection from stage to stage. It is, of course, contemplated that the ethernet will soon expand its capability beyond a 100 meter separation. The processing line 12 of FIG. 1 is shown as having 8 stages, identified as 12a-12g. In a steel mill environment, the stages might sequentially represent a reheat furnace (12a), scale breaker and descaling sprays (12b), roughing stands (12c), a descaling unit (12d), a finishing mill (12e), a runout table cooling unit (12f) and a coiler (12g). Of course, the concept of the invention is applicable to any of numerous industrial processing lines.

As shown in FIG. 1, each stage 12a-12g is provided with an array of monitoring instruments or circuits 14a-14g at each stage. The monitoring instruments or circuits 14 may be of various natures, employed for monitoring the operation of AC or DC electric motors, supply voltages, current measurements, RPM, temperature, and the like.

Associated with each of the array of monitoring instruments 14a-14g are respective ethernet interface gates 16a-16g, the same being interconnected by means of a data/control buss at 18a-18g, as shown. Each of the ethernet interface gates 16a-16g is provided with an input connector 20 and an output connector 22, the same being standard jacks having four twisted-pair conductors each, the same being standard category 5 conductors used with the ethernet. The ethernet 24 provides interconnection between the ethernet interface gates 16 in daisy chain fashion, as shown. In other words, the output connector 22 of each ethernet interface gate 16 interconnects with the input gate 20 of the next sequential ethernet interface gate 16. Of course, the output of the final ethernet interface gate 16g is not employed. Moreover, the input 20a of the first ethernet interface gate 16a is connected through the ethernet 24 to an appropriate processor 26, such as a digital processing unit, personal computer, or dedicated microprocessor.

In operation, the personal computer 26, by the application of appropriate commands and addresses, can obtain selected data conveyed to selected stages 14 of the processing line 12 by buss 28a-28g, which carries significant analog and discrete information that describe the processing line's status and performance. By controlling the ethernet interface gate 16 at each stage with the same clock and by synchronizing the clock as it appears at each stage at the beginning of a data acquisition cycle, the data obtained from each stage is time correlated with the data obtained from all other stages. It will be appreciated that, regardless of data acquisition period, fractions of a second, minutes, days, or months, all information is acquired fully synchronized and continuously across the entire distributed length of individual stages.

It will be appreciated that the monitoring instruments or circuits 14, which may be of various configurations, receive command, status and address signals and effect the transfer of data by means of the data/control buss 18.

Figure 2:
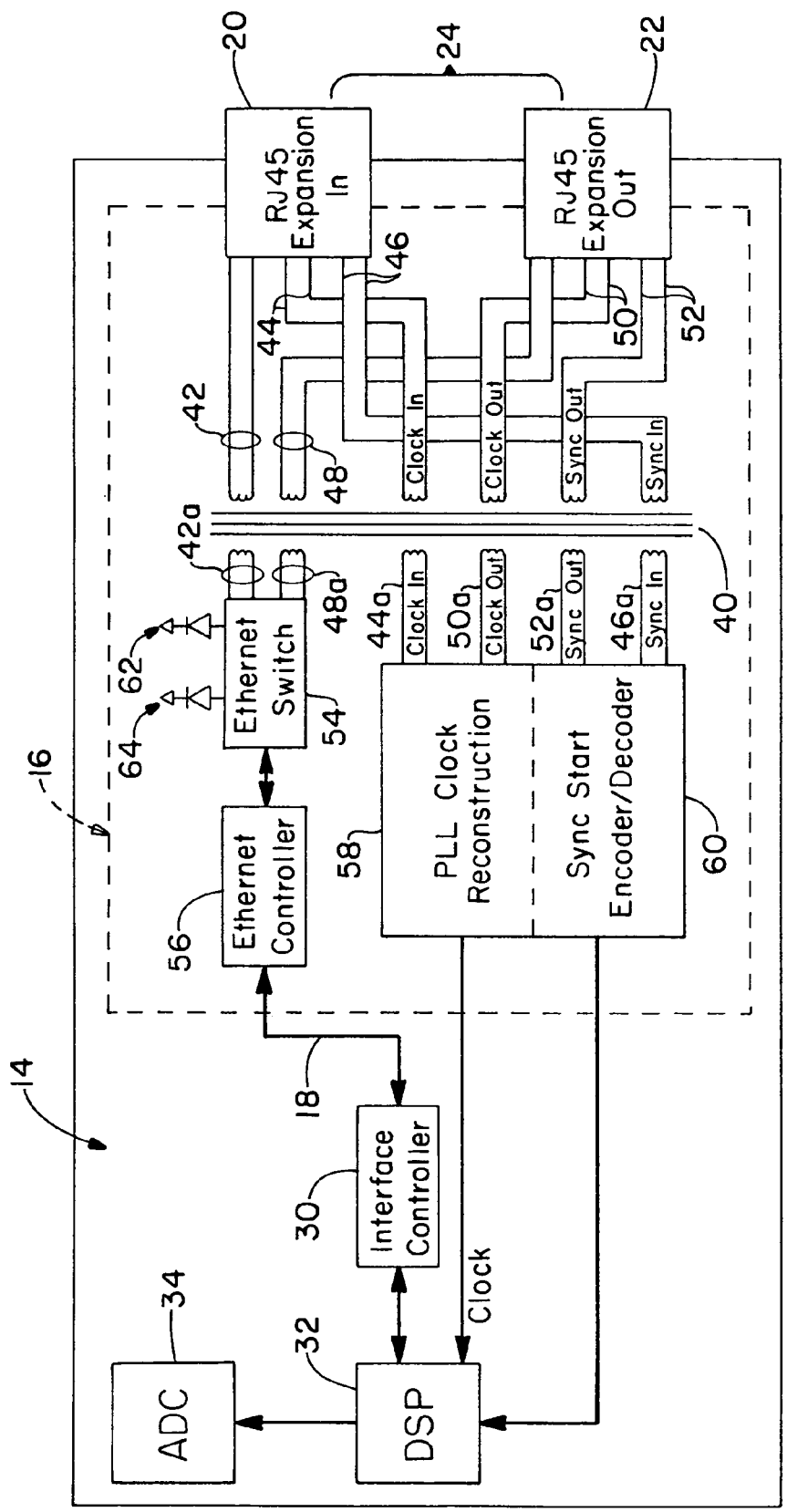
FIG. 2 is a block diagram of the ethernet interface gates of the invention, showing their interconnection with the monitoring instruments of the various processing stages and the ethernet.

The array of monitoring instruments 14 and their interconnection to the ethernet interface gate 16 of the invention is shown generally in FIG. 2. Typically, the monitoring instruments or circuits 14 may comprise a DI-730 series data acquisition system as manufactured and distributed by DATAQ Instruments, Inc. of Akron, Ohio. Such data acquisition systems are used as stated above, for maintaining and troubleshooting AC or DC drive systems, such as those encountered in industrial mills, high speed trains, various locomotion devices, and the like. Typically, such a data acquisition device includes an internal buss 18a-18g to handle the routing of command and data from a monitoring instrument 14 associated with a particular stage of the processing line 12. The internal buss 30 provides two way communication with a digital signal processor 32 which is interconnected to an analog to digital converter 34, as shown. Clock and sync signals are provided to the digital signal processor 32, to initiate and maintain the acquisition of data at a particular clock cycle rate.

As shown in FIG. 2, inductive coupling 40 is provided in eight separate instances to reduce noise and to isolate the signals of the input 20 (toward PC) and output 22 (expansion) of the ethernet. The inductive coupling is employed for transmitting and receiving the various command, status, data and address signals as well as the clock and synchronization signals to and from the sequentially interconnected ethernet interface gates 16 and the digital controller 26. The control, address and data signals are similarly routed, it being understood that a characteristic of the ethernet is the ability to access devices on the ethernet by their specific address. Hence, while all of the instruments of circuits 14 may receive the same command, only the one specifically addressed will respond.

As shown, the toward PC connector 20 has two twisted-pair 42 provided for transmitting of control signals and receipt of data. Another twisted-pair 44 carries a clock signal, and a final twisted-pair 46 carries the synchronization signal to individual inductive couplers 40. The expansion connector 22 has two twisted-pair 48 for transmitting control signals and receiving data, and a single twisted-pair 50 for a clock signal and a single twisted-pair 52 for the synchronization signal. Accordingly, the standard Category 5 ethernet cable employed with the connectors of all four twisted-pair associated with each of the connectors.

As shown in FIG. 2, the conductors of the various twisted-pair 42-52 are inductively coupled as at 40 to corresponding twisted-pair 42a-52a. It will be readily appreciated that in the daisy chain connection of the ethernet interface gates 16 presented with respect to FIG. 1, the "clock out" signal of one stage becomes the "clock in" signal of the next sequential stage, as does the "sync out" signal of one stage becomes the "sync in" signal of the next stage.

Each of the ethernet interface gates 16 includes an ethernet switch 54, a standard item that allows for the selective interconnection of the pairs of twisted-pair 42a and 48a to be respectively connected to the input connector 20 or output connector 22. An ethernet controller 56, again standard and well known in the art, provides for the controlled transfer of commands, status signals, addresses, and data on the buss 18 and to and from the switch 54.

A key feature of the instant invention is the presentation of the same clock signal and synchronization signal at each of the array of monitoring instruments or circuits 14 along the ethernet. In this regard, a phase lock loop clock reconstruction circuit 58 is used to reshape and restructure the clock at each stage along the line. The phase lock loop clock reconstruction circuit 58 employs a differential receiver for the clock signal.

A synchronization circuit 60 is also provided as part and parcel of each of the ethernet interface gates 16. Those skilled in the art will appreciate that the sync signal is generated at the start of each data acquisition period to assure that the acquisition of data at each of the various stages starts at the same time and is subsequently maintained by the same clock. After the sync signal is received, each stage acquires data continuously and synchronously with all the other stages without phase or frequency drift.

It should be appreciated that, in accordance with the invention, standard data acquisition equipment, previously known, may be employed at the various stages along the processing line. However, by making full use of all four twisted-pair of the connectors 20, 22, a synchronization signal and clock signal may be employed to effect time controlled and correlated data acquisition at each of the various stages of the ethernet-based processing system.

Thus it can be seen that the various aspects of the invention have been achieved by the structure presented herein above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A synchronized data acquisition system in a processing line having a plurality of stages, each stage separated from adjacent stages by up to 100 meters or more, comprising a plurality of monitoring instruments, one at each of the stages of the processing line, for monitoring selected operating parameters at such stages; a plurality of ethernet interface gates, one associated and communicating with each of said monitoring instruments, said ethernet interface gates being daisy-chained together, each to an immediately adjacent one, said ethernet interface gates having an ethernet input and output, the inputs and outputs of at least certain of said ethernet interface gates being respectively connected to the output and input of adjacent Ethernet interface gates; a data and control buss interconnecting each of said ethernet interface gates with an associated one of said monitoring instruments;
    a processing unit connected to one of said ethernet interface gates; and
    wherein each said ethernet interface gate has a phase lock loop clock reconstruction circuit, receiving said clock signal from said ethernet input, applying it to an associated monitoring instrument, and passing it to said ethernet output, and a synchronization circuit, receiving said synchronization signal from said ethernet input, applying it to an associated monitoring instrument, and passing it to said ethernet output, wherein said phase lock loop clock restoration circuit has a crystal oscillator which is adjustably phase-aligned to said clock signal.

2. The synchronized data acquisition system as recited in claim 1, wherein each said ethernet input and output comprises four twisted-pair conductors.

3. The synchronized data acquisition system as recited in claim 2, wherein
    first said twisted-pair carries a synchronization signal, a second said twisted-pair carries a clock signal, and said third and fourth twisted-pair carry command, status, data and address signals.

4. The synchronized data acquisition system as recited in claim 3, wherein each said ethernet interface gate has an ethernet switch operatively interposed between an associated monitoring instrument and said ethernet input and output, selectively interconnecting said ethernet input and output with said associated monitoring system for passing said command, status, data and address signals therebetween.

5. The synchronized data acquisition system as recited in claim 4, wherein
    said ethernet interface gate further comprises an ethernet controller interposed between said ethernet switch and said monitoring instrument.

6. The synchronized data acquisition system as recited in claim 5, wherein
    said synchronization signal, clock signal, and command, status, data and address signals are inductively coupled to and from said ethernet input and output.

7. The synchronized data acquisition system as recited in claim 6, wherein said twisted pair conductors comprise standard Category 5 conductors.

8. A synchronized data acquisition system in a processing line having a plurality of processing stations, interconnected by an ethernet, comprising: a plurality of monitoring instruments, one at each processing station and separated by up to 100 meters or more between stations, monitoring selected operating parameters at said station; a plurality of ethernet interface gates, one associated and communicating with each of said monitoring instruments, each interface gate having an ethernet input and output, said input and output of at least certain of said ethernet interface gates being connected to said output and input of said interface gate of adjacent stations respectively; a data control buss interconnecting each of said ethernet interface gates with an associated one of said monitoring instruments; a digital processing unit connected to an input of one of said ethernet interface gates; and wherein said ethernet input and output of said ethernet interface gates each comprise four twisted-pair conductors, a first twisted-pair conductor carries a clock signal, a second twisted-pair conductor carries a synchronization signal, and third and fourth twisted-pair conductors carry command, status, data and address signals, and said clock signal is received by a differential receiver and phase lock loop circuit for integrity reconstruction before being passed to a subsequent ethernet interface gate, said phase lock loop circuit having a crystal oscillator which is adjustably phase-aligned to said clock signal.

9. The synchronized data acquisition system according to claim 8, wherein said ethernet interface gate comprises an ethernet switch selectively receiving and passing said command, status, data and address signals from and to said associated monitoring instruments and ethernet input and output.

10. The synchronized data acquisition system according to claim 9, wherein said ethernet interface gate comprises a synchronization circuit receiving and passing said synchronization signal from and to ethernet interface gates of adjacent processing stations and to an associated monitoring instrument.

11. The synchronized data acquisition system according to claim 10, wherein said ethernet input and output of each said interface gate is inductively coupled to said ethernet switch, differential receiver and phase lock loop circuit, and synchronization circuit.

* * * * *